United States Patent [19]

Moseley et al.

[11] Patent Number: 5,144,278

[45] Date of Patent: Sep. 1, 1992

[54] VARIABLE IMPEDANCE DEVICE AND CIRCUIT FOR SENSING ADJUSTMENT THEREOF

[75] Inventors: Robin C. Moseley, Allentown; Jonathan A. Barney, Whitehall, both of Pa.; Arjuna Karunaratne, Union City, Calif.

[73] Assignee: Lutron Electronics Co., Inc., Coopersburg, Pa.

[21] Appl. No.: 388,185

[22] Filed: Aug. 1, 1989

[51] Int. Cl.⁵ .............................................. H01C 10/50
[52] U.S. Cl. .................................. 338/198; 338/200; 338/201; 338/172; 338/178; 338/217
[58] Field of Search ............... 338/198, 200, 201, 172, 338/178, 179, 183, 185, 188, 191, 217, 89; 200/16 C, 16 D, 16 R

[56] References Cited

U.S. PATENT DOCUMENTS

| | | | |
|---|---|---|---|
| 3,028,572 | 4/1962 | Luger | 338/176 |
| 3,317,877 | 5/1967 | Matsumoto | 338/89 |
| 3,723,938 | 3/1973 | Gramm | 338/162 |
| 4,123,741 | 10/1978 | Kiyono et al. | 338/121 |
| 4,243,969 | 1/1981 | Steigerwald et al. | 338/309 |
| 4,249,157 | 2/1981 | Sakamoto | 338/176 |
| 4,357,592 | 11/1982 | Okuya | 338/198 |
| 4,647,897 | 3/1987 | Bingold et al. | 338/172 |
| 4,689,547 | 8/1987 | Rowen et al. | 323/239 |
| 4,706,062 | 11/1987 | Männle et al. | 338/172 |
| 4,742,188 | 5/1988 | Buehler et al. | 200/16 R |
| 4,797,599 | 1/1989 | Ference et al. | 315/194 |
| 4,841,221 | 6/1989 | Barney et al. | 323/320 |
| 4,922,063 | 5/1990 | Shimizu et al. | 200/16 D X |
| 4,939,383 | 7/1990 | Tucker et al. | 338/200 X |

OTHER PUBLICATIONS

Lutron Electronics Co., Inc.—Nova Omnislide Brochure—P/N 360-167, 1988.

*Primary Examiner*—Marvin M. Lateef
*Attorney, Agent, or Firm*—Seidel, Gonda, Lavorgna & Monaco

[57] ABSTRACT

A circuit and apparatus for sensing the adjustment of a variable impedance device includes an elongated switching element having an alternating series of conductive and non-conductive areas. The conductive areas are electrically connected. As the device is adjusted, a wiper alternately operates the switch between open and closed states. A circuit detects the switch-state change and provides a signal which indicates that the device is being adjusted. The signal can, in turn, determine the output of a dimming circuit, a wireless transmitter, etc., or can determine whether power is provided to a microprocessor or the like. In another embodiment of the invention, a variable impedance device includes an end-of-travel return mechanism.

19 Claims, 5 Drawing Sheets

VARIABLE IMPEDANCE DEVICE AND CIRCUIT FOR SENSING ADJUSTMENT THEREOF

FIELD OF THE INVENTION

This invention relates to variable impedance devices and more specifically a circuit for sensing adjustment of a variable impedance.

DESCRIPTION OF THE RELATED ART

Variable impedance devices, such as variable resistors and potentiometers, are circuit elements that are commonly used to adjust some output parameter of a circuit. A typical device comprises a resistive element, a conductive element, and a wiper that has two or more metal contacts which provide movable electrical contact between points along the elements. The wiper travels along a linear path in the case of a linear device and along a circular path in the case of a rotary device. As the wiper moves, it continuously varies the resistance measured between the conductive element and an end of the resistive element. This variable resistance can be used to control a circuit. For example, U.S. Pat. No. 4,797,599, issued Jan. 10, 1989, to Ference et al. (incorporated herein by reference), discloses a circuit (FIG. 7) that controls power from an AC source to a lighting load in accordance with the setting of a variable resistor. The variable resistor controls the time constant of an RC circuit which, in turn, determines power to the load. As another example, U.S. patent application Ser. No. 079,847, filed Jul. 30, 1987, abandoned in favor of U.S. patent application Ser. No. 430,922, filed Nov. 1, 1989, incorporated herein by reference, discloses an infrared remote control transmitter, which uses a circuit whose output corresponds to the setting of a variable resistor. In each of these cases, there is a one to one correspondence between the value of the variable resistor and the output of the circuit.

In some applications, there is not a one to one correspondence between the value of a particular variable impedance device and the output of the circuit. This is the case, for instance, when a circuit is controlled by any one of a number of variable resistors, each one operable to provide a certain resistance. In this case, it is desirable to be able to selectively connect a particular variable resistor to the control circuit.

For example, a momentary contact switch, corresponding to each variable resistor, can operate a latching relay to connect a particular variable resistor to the circuit. This type of control is cumbersome, however, because in order to change the output of the circuit, an operator must actuate the momentary contact switch before or after adjusting the variable resistor.

U.S. Pat. No. 4,689,547, issued Aug. 25, 1987, to Rowen et al., incorporated herein by reference, discloses a system that overcomes this drawback in multilocation control systems. This system automatically provides control to a location when a variable resistor adjustment (i.e., control) actuator at that location is operated. The system details are as follows: at each location, a momentary contact switch is contained in a support frame, which is attached to the control actuator (usually a sliding lever). The switch is operated by miniature buttons on either side of the frame. The actuator engages the support frame such that a force applied to the actuator displaces one button or the other, operating the momentary switch and a relay. Simultaneously, the actuator causes the wiper to translate along the resistive element. The relay operates to automatically switch the variable resistor into the circuit. This system is currently embodied in the Omnislide TM lighting control system, manufactured by Lutron Electronics Co., Inc., Coopersburg, Pa. The system, which allows two-location adjustment of power provided to a lighting load, operates satisfactorily; however, the momentary contact switch and frame are expensive to manufacture and, in operation, require a substantial portion of the space available for the control circuit and remaining components.

SUMMARY OF THE INVENTION

The present invention provides a variable impedance device with an integral switch. As the variable impedance device is adjusted, a wiper alternately operates the switch between open and closed states. This can be detected to indicate when the device is being adjusted. The device generally comprises an elongated resistive element and an elongated switching element mounted co-extensively and parallel to each other. A conductive sliding wiper is operable to electrically connect both elements at any point along their respective lengths to corresponding elongated conductive elements. The switching-element generally comprises a series of conductive areas that are electrically connected together and separated by an alternating series of non-conductive areas. A state change of the switch is readily detected by a specially adapted circuit (discussed in more detail below) which can enable a dimming circuit or the like to respond to the variable resistance.

A variable impedance device with an end-of-travel return mechanism includes a movable actuator rigidly attached to the wiper and constrained to move between two endpoints. A spring engages the actuator near each end point such that when there are no other forces acting on the actuator the spring pushes the actuator back a predetermined distance from each end point. As the actuator traverses this distance, the integral switch preferably undergoes at least one state change.

A circuit of the present invention for detecting the state change of a switch generally comprises a triac with a capacitor in series with its gate terminal. The switch is connected in series with the capacitor such that when the switch closes, current charges the capacitor through the triac gate and a series-connected resistor, causing the triac to conduct. A resistor in shunt with the capacitor and gate allows the capacitor to discharge through the gate, causing the triac also to conduct as the switch is opened. The two resistors preferably have equal resistance values.

An alternative circuit of the present invention for detecting the state change of a switch generally comprises an XOR gate having two input and one output terminal. The output of the XOR gate is high if, and only if, the inputs are unequal, otherwise, it is low. A voltage across a switch is provided to each input terminal through corresponding resistors, one of which is connected in shunt with a capacitor to ground. The circuit characteristics are such that the steady state voltages on the two input terminals are always equal; however, when the switch changes states, the capacitor cannot exhibit an instantaneous change in voltage and must charge or discharge, causing the two inputs to be momentarily unequal. The resulting high bit output operates a relay or other type of controllably conductive device to enable a circuit to respond to a variable resistance or the like. As used in this specification and the appended claims, a controllably conductive device is any device that can alter its electrical conductivity in response to an electrical signal provided to a control terminal, such as a triac, silicon controlled rectifier, thyristor, relay, etc.

In one embodiment of the present invention, a combination variable impedance device and switch comprises, in combination:
a) an extended resistive element,
b) an extended switching element, substantially co-extensive with said resistive element, and including alternating conductive and substantially non-conductive regions, said conductive regions being electrically connected,
c) at least one extended conductive element, substantially co-extensive with said resistive element, and
d) conductive sliding means to electrically connect said at least one conductive element to said resistive element and said switching element, respectively, at a selectable point along their extent.

In another embodiment of the present invention, a variable impedance device comprises, in combination:
a) an extended resistive element,
b) an extended conductive element,
c) conductive sliding means to electrically connect said conductive element to said resistive element at a selectable point along their extent, said sliding means being constrained to move along a path having two ends, and
d) resilient restoring means to engage said sliding means near at least one of said ends and restore said sliding means to a point that is a predetermined distance from said at least one end.

In another embodiment of the present invention, a circuit for detecting a state change of a switch comprises, in combination:
a) a controllably conductive device having a terminal for controlling its conductivity,
b) an energy storage device electrically connected to said control terminal, and
c) a first and second resistor connected in series and shunt, respectively, with said storage device,
wherein said switch is connected in series with said first resistor and said energy storage device so that current passes through said control terminal when said switch either opens or closes.

In another embodiment of the present invention, a circuit for detecting a state change of a switch comprises, in combination:
a) comparator means for providing at an output terminal a voltage corresponding to the difference between voltages applied at first and second input terminals thereof,
b) a first resistor having one end connected to a terminal of said switch and said first input terminal,
c) means for applying a voltage across said first resistor and switch,
d) a second resistor connected between said switch terminal and said second input terminal, and
e) an energy storage device connected between said second input terminal and a current sink,
whereby a voltage appears at said output terminal when said switch changes states.

DETAILED DESCRIPTION OF THE INVENTION

Figure 1A:
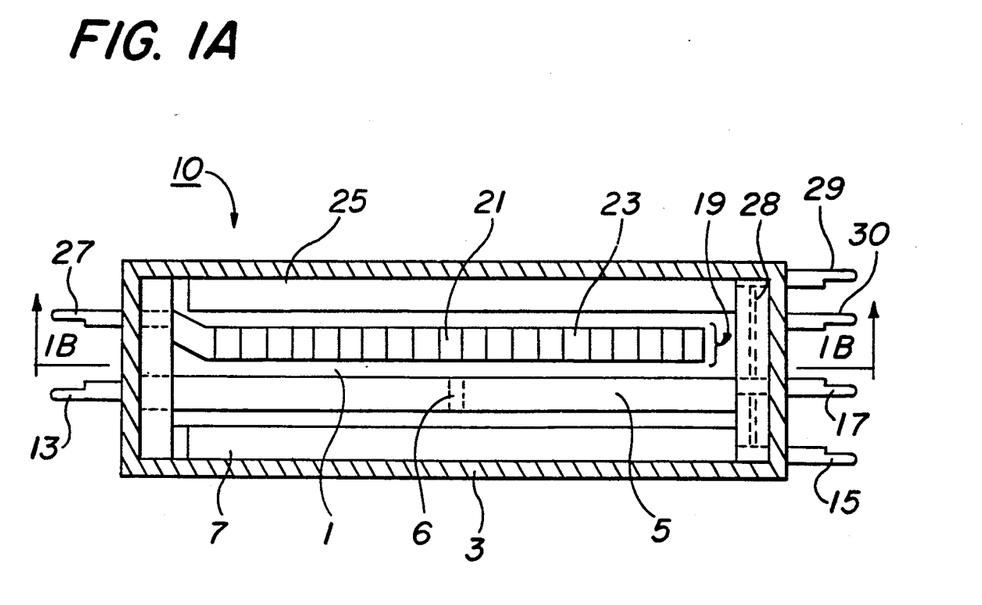
FIG. 1A is a horizontal cross-section view of a combination variable impedance device and integral switch of the present invention.
Figure 1B:
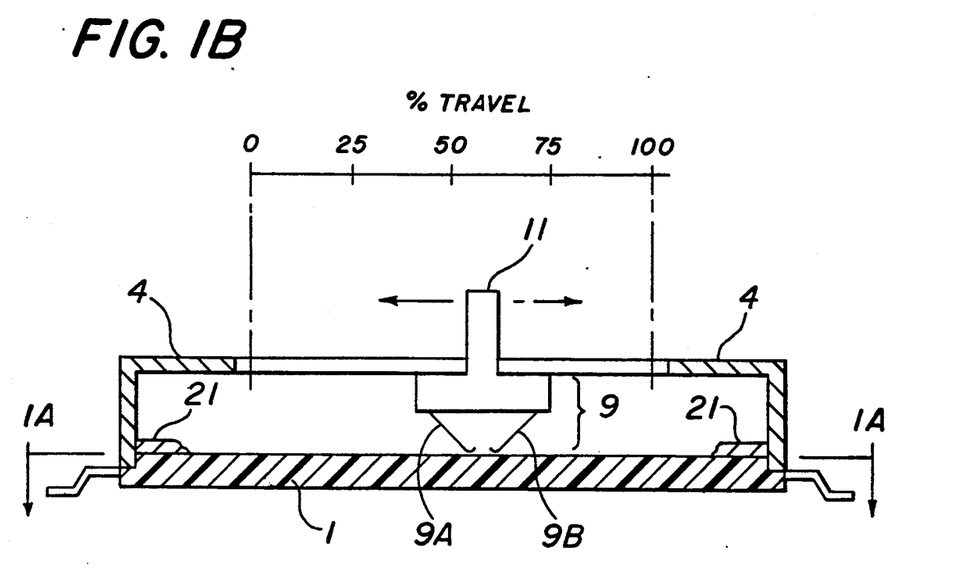
FIG. 1B is a vertical cross-section view, taken along line 1B—1B, of the device of FIG. 1A.
Figure 2:
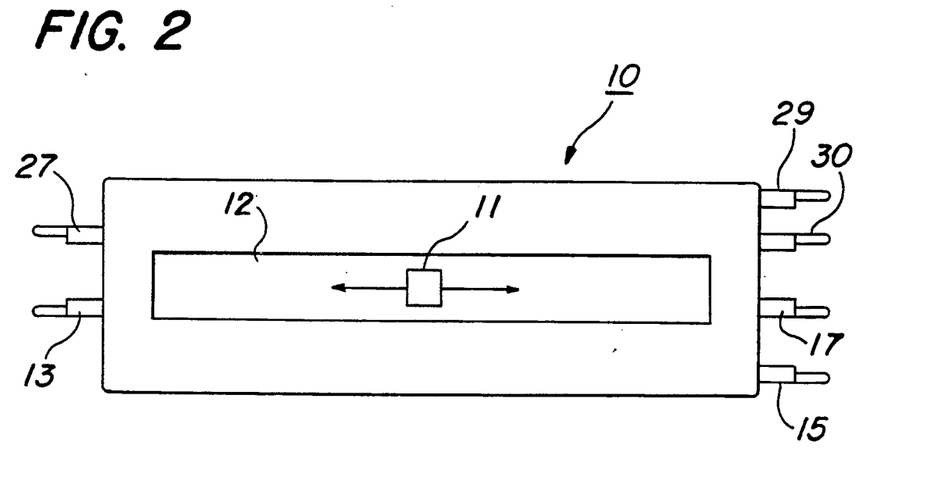
FIG. 2 is a top view of the device illustrated in FIGS. 1A and 1B.

FIGS. 1A and 1B show horizontal and vertical cross-section views, respectively, of the combination variable impedance device and integral switch 10 of the present invention. FIG. 1B is a view, taken along line 1B—1B, of FIG. 1A. The device 10 of FIGS. 1A and 1B is also shown in FIG. 2 which is a top view thereof showing an actuator 11 positionable within a channel or path 12 and movable, as indicated by arrows, from left to right or right to left. Substrate 1, shown in both FIGS. 1A and 1B, is preferably an electrically insulating plate, such as an epoxy laminate or a phenolic resin lamination plate, which is retained by a bezel 3 of FIG. 1A Bezel 3 is preferably insulating and engages frame 4 of FIG. 1B, which is preferably formed from sheet metal. Resistive element 5 is deposited on substrate 1, preferably by silk screening with a resistive ink. Conductive element 7 also deposited on substrate 1 is similarly formed using a metal-containing ink or the like. Resistive element 5 is electrically connectable at any point along its length to a corresponding point along conductive element 7 via wiper 9 shown in FIG. 1B. As previously discussed in the "Related Art" section, a wiper, such as wiper 9, has two or more metal contacts which provide movable electric contact between points along elements. For the embodiment of FIGS. 1A, 1B and 2, the wiper 9 has at least two movable contacts, such as 9A and 9B, each of which cooperate with other contacts (not shown) to span between and contact a first conductive member and a switching element and between a second conductive member and a resistive element. As mentioned in the "Summary" section, and as to be more fully described, as the wiper 9 moves it continuously varies the resistance between the conductive member 7 and one end of the resistive element 5 while at the same time it alternately operates, by means of switching element 19, a switch to be described with reference to FIGS. 5 and 6. Wiper 9 moves left or right, as shown in FIGS. 1A and 2, in response to a force applied to wiper actuator 11, to provide an adjustable resistance between terminals 13 and 15 and between terminals 17 and 15. Terminal 15 is connected to conductive element 7, whereas, terminal 13 is connected to one end of resistive element 5 providing a first adjustable resistive path. Terminal 17 is connected to the other end of resistive element 5 so as to provide a second adjustable resistive path. Either of these first or second adjustable resistance path sharing the resistive element 5 can control the power output of a dimming circuit, for example. Alternatively, resistive element 5 may comprise two sections placed end to end and separated by a small gap such that there is no conductive path between terminals 13 and 17. Such an arrangement is illustrated in FIG. 1A by means of a gap 6 shown in phantom. As to be further described, the resistance of element 5 may vary in a linear manner or it may vary in a logarithmic or exponentially tapered manner. The desired resistance variation may be accomplished by the appropriate selection of the ingredients comprising the material of element 5 along with the selection of the geometry in which the resistive element is deposited or formed onto the substrate 1. For the purpose of this specification and the appended claims, "conductive" and "resistive" are relative terms as applied to electrical elements. Thus, the essential feature of resistive element 5 is electrical resistance and the essential feature of conductive element 7 is electrical conductance.

Switching element 19 shown in FIG. 1A, preferably consists of a series of alternately conductive and non-conductive areas, such as 21 and 23, respectively, which are deposited on substrate 1. Conductive areas 21 are preferably electrically connected via conductive ink that underlies non-conductive areas 23. Alternatively, switching element 19 could consist of a series of conductive areas linearly spaced along the substrate and electrically connected via a narrow conductor running along one edge. The conductive areas are not necessarily evenly spaced or of the same size. At any point along its length, switching element 19 is electrically connectable, via wiper 9, to a corresponding point along conductive element 25, which is preferably electrically isolated from, but can be connected to, conductive element 7 so as to serve as a conductive member for both the adjustable resistance and switching functions of the present invention. In one embodiment, the switching element 19 is connected to terminal 27 and the conductive strip 25 is separately connected to terminal 29. In another embodiment, wherein one conductive member provides for both the adjustable resistance and switching function, an interconnection, such as a jumper 28, need only be placed between terminals 15 and 29 and one conductive element 25 or 7 need only be deposited on substrate 1. If wiper 9 contacts a conductive area 21, there is essentially zero impedance between terminals 27 and 29. Alternatively, if wiper 9 contacts a non-conductive area, the impedance between terminals 27 and 29 is essentially infinite. In operation, as wiper 9 is adjusted in one direction or another, the impedance between terminals 27 and 29 alternates or switches between zero and infinity. This can be sensed by a circuit, described later, which provides a signal in accordance with the adjustment. This signal, in turn, can control the output of a circuit, such as a dimming circuit. The number of switching cycles is determined by the number and spacing of conductive and non-conductive areas and is preferably as large as possible, although 25-30 per inch is sufficient for most applications.

Figure 3A:
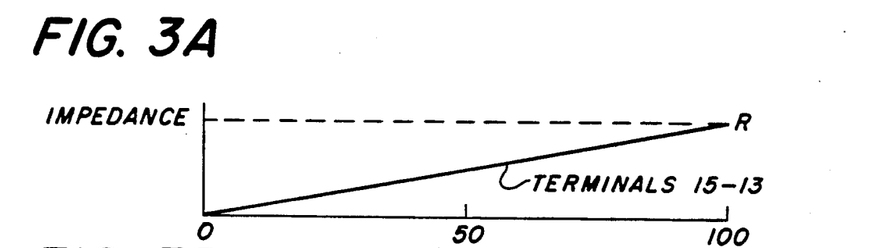
FIGS. 3A, 3B and 3C show graphs of impedance characteristics of the device of FIG. 1.
Figure 3B:
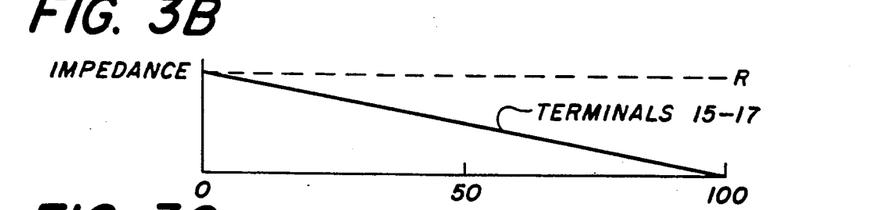
Figure 3C:
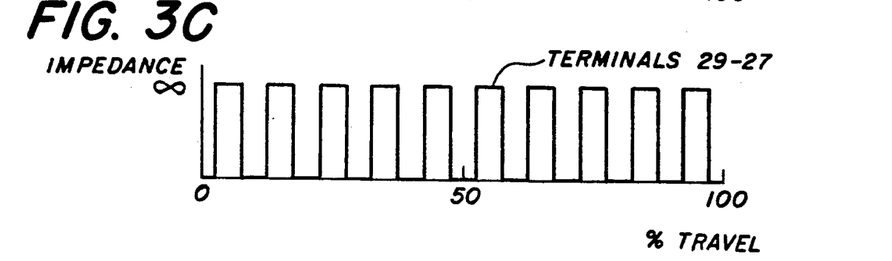

FIGS. 3A, 3B and 3C show graphs of impedance characteristics of the variable impedance device described above. The impedance between terminals 15 and 13 (FIG. 3A) increases linearly from essentially zero at zero percent travel to some value R at 100 percent travel as wiper 9, in FIGS. 1B and 2, moves from left to right. The impedance between terminals 15 and 17 (FIG. 3B) behaves similarly, except with a negative slope. Although a linear relationship between impedance and percent wiper travel is common, any functional relationship, such as a logarithmic or second power exponential taper, can alternatively be provided. The impedance between switching element terminals 27 and 29 (FIG. 3C) preferably alternates between essentially zero and infinity as the wiper is adjusted. Alternatively, the switching element may be constructed so that this impedance alternates between two finite impedances. A sawtooth, sinusoidal or any other convenient functional relationship between impedance and percent travel can also be provided.

It is desirable to be able to operate the device of FIGS. 1B and 2 by applying a force to actuator 11 in either direction, regardless of its position. However, if actuator 11 is at zero or a hundred percent of full travel, the switch cannot change states when a force is applied to the left or right, respectively, since wiper 9 is restrained from moving further in those directions. Accordingly, the present invention further provides an end-of-travel return mechanism for resiliently deflecting actuator 11 a predetermined distance away from its extreme ends of travel.

Figure 4:
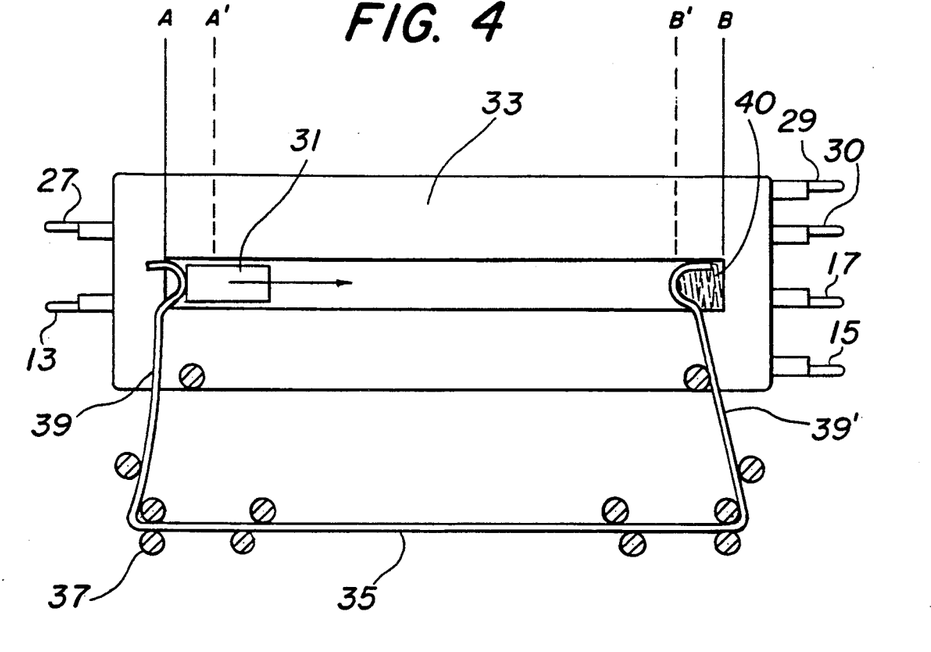
FIG. 4 is a top view of an end-of-travel return mechanism of the present invention.

FIG. 4 is a top view of an end-of-travel return mechanism of the present invention. Actuator 31 slides within frame 33 between points A and B to adjust the value of a variable impedance device and to operate an integral switch or some other adjustment sensing device. Wire spring 35 is held in place by posts, such as 37, which are fixed with respect to frame 33. The posts can be attached to frame 33, but are preferably elements of a supporting structure (not shown). Cantilevered ends 39 and 39' of wire spring 35 operate to deflect actuator 31 away from end points A and B, respectively. If a sufficient force is applied to actuator 31, cantilevered ends 39 and 39' elastically flex outward allowing the actuator to contact frame 33 at points A and B. After the force is removed, actuator 31 moves back to points A' and B', respectively. The distances between points A and A', and points B and B' are preferably equal and sufficient to allow operation of an integral switch or other adjustment sensing device. Wire spring 35 may alternatively be replaced by any suitable resilient element or elements, such as a coil spring, rubber pads, etc. Such an alternate embodiment is illustrated in FIG. 4 by means of spring coils 40 oppositely located at the ends of the path traveled by actuator 11 and one of which is shown in phantom in FIG. 4. Alternatively, an actuator that moves on a rotatable shaft to be described with reference to FIG. 9, may be displaced from its end of travel by a torsion spring.

Figure 5:
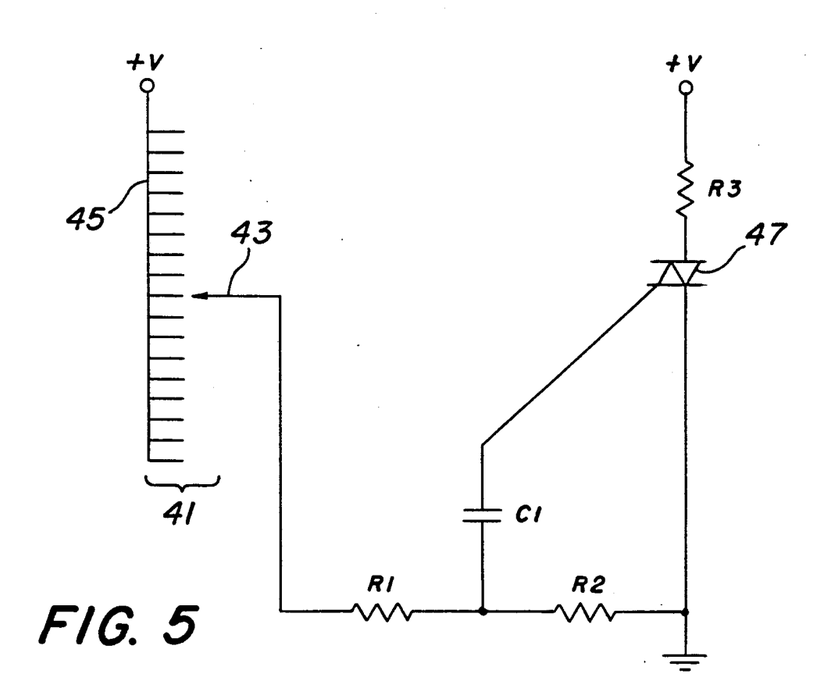
FIG. 5 is a circuit diagram of a switch-state change sensor of the present invention.

FIG. 5 is a schematic diagram of a switch-state change sensing circuit of the present invention. It operates as follows: If switch 41 is initially open, sliding wiper 43 either up or down causes the wiper to contact a conductive area of switching element 45, providing a voltage +V to wiper 43. This voltage causes current (preferably less than 5 mA) to flow through resistors R1 and R2, charging capacitor C1 through the gate of triac 47. Triac 47 becomes conductive and current flows through R3. A separate circuit, such as a dimmer or wireless transmitter (not shown), responds to the conductivity of triac 47 to operate a relay or the like and then momentarily removes voltage V+ from R3 to restore triac 47 to its non-conductive state. Alternatively, the conductivity of triac 47 may determine whether or not power is provided to a microprocessor or the like.

If switch 41 is initially closed, capacitor C1 is charged and current flows to ground through resistors R1 and R2. As wiper element 43 is displaced up or down, it becomes disconnected from the conductive area of switching element 45, opening switch 41. Capacitor C1 discharges through resistor R2 and the gate of triac 47 causing the triac to become conductive. Resistors R1 and R2 are preferably equal in value and are selected, along with capacitor C1, to provide sufficient current (>0.2mA) to the gate of triac 47 to cause it to become conductive whenever switch 41 changes state. Switch 41 can be any type of device that provides a rapid variation in the magnitude of an output voltage, such as a momentary contact switch, a toggle switch or the integral switch described above. Alternatively, switch 41 can comprise one or more elements of a digital potentiometer. (See, for instance, U.S. Pat. No. 4,249,157, issued Feb. 3, 1981, to Sakamoto, incorporated herein by reference). Although the circuit of FIG. 5 incorporates a capacitor and a triac, the circuit can alternatively include any suitable type of energy storage element and controllably conductive device, respectively.

Figure 6:
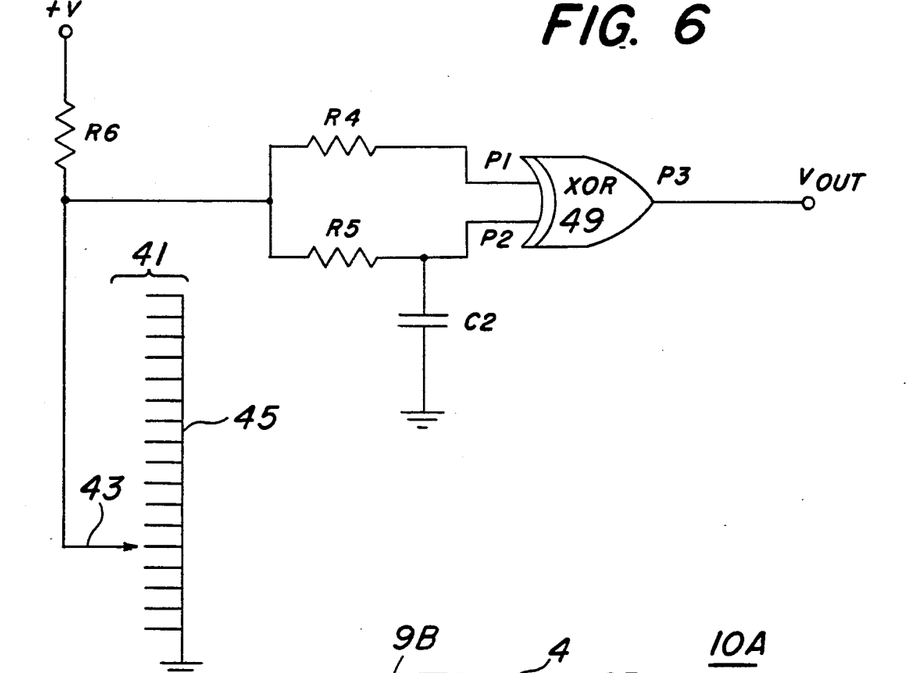
FIG. 6 is a circuit diagram of an alternative switch-state change sensor of the present invention.

FIG. 6 is a schematic diagram of an alternative switch-state change sensing circuit of the present invention. The circuit operates as follows: If switch 41 is initially closed, sliding wiper 43 either up or down disconnects it from a conductive area of switch element 45 and pulls wiper 43 up to +V volts. Input pin P1 is simultaneously pulled high through optional resistor R4; however, because capacitor C2 cannot charge instantaneously, a low bit is on input pin P2 while C2 is charging up through resistor R5. XOR gate 49 provides a high bit, because P1 and P2 are in opposite states, signifying that switch 41 has changed states. Once capacitor C2 charges up to +V volts, both input pins P1 and P2 are high and the output pin P3 is low. If wiper 43 is displaced further, it contacts a conductive area of switching element 45 pulling wiper 43 and one side of R6 low. Input pin P1 is simultaneously pulled low through optional resistor R4; however, because capacitor C2 is charged to +V volts, it maintains a high bit on P2 while it discharges through resistor R5. The output of XOR gate 49 again goes high, signifying that switch 41 has changed states. Optional resistor R4, in combination with the inherent capacitance on gate input terminal P1, limits EMI noise to XOR gate 49. Resistor R4 is preferably equal in value to resistor R5. Although switch 41, as shown, includes an elongated switching element 45, switch 41 can alternatively comprise any suitable type of switch, such as a momentary contact switch, a toggle switch, etc. The output of XOR gate 49 can determine the output of a dimmer, or a wireless transmitter, etc., or it can determine whether power is provided to a microprocessor. XOR gate 49 can alternatively be replaced with any type of comparator or similar circuit, such as an XNOR gate, a microprocessor, etc.

It is envisioned that any of the embodiments herein described or shown in the accompanying drawings can be incorporated, alone or in combination, in any applications which heretofore have utilized conventional variable impedance devices or potentiometers.

Figure 7:
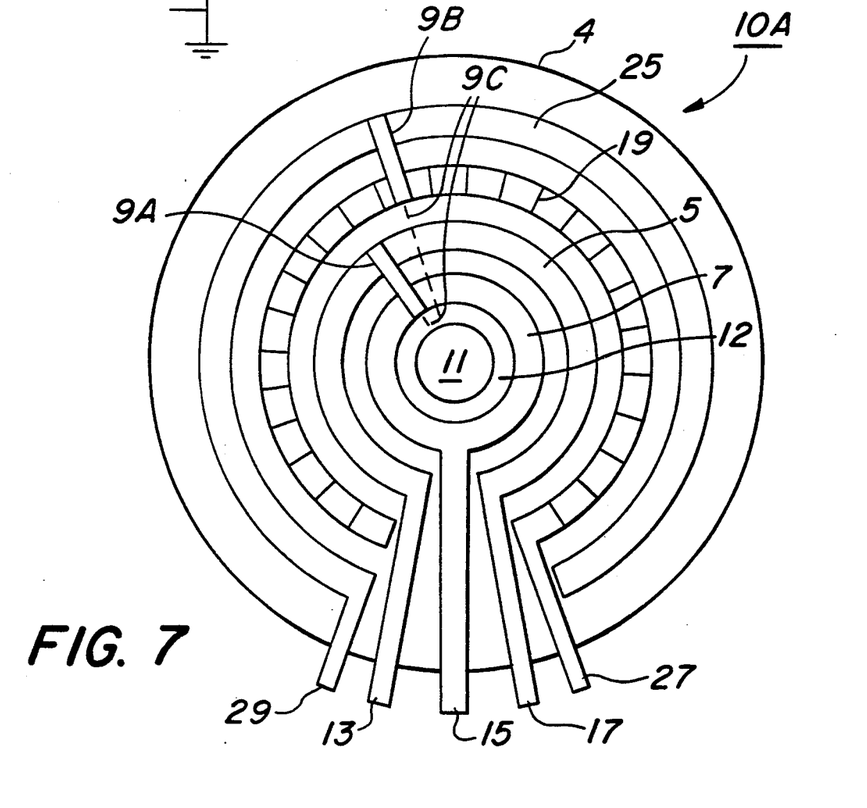
FIG. 7 illustrates a rotary device in accordance with another embodiment of the present invention having curved paths for its resistance, conductive, and switching elements.

A variable device of the present invention having a conventional shape of a rotary type potentiometer is shown in FIG. 7. FIG. 7 is a functional representation of an embodiment 10A showing each of the elements 25, 19, 5 and 7 as having a circular shape with element 7 being the most inward. The actuator 11 is shown as positionable within a curved path 12 and as having wiper members 9A and 9B each with a mechanical linkage 9C to the actuator 11. The wiper members 9A and 9B are slidable along the circular paths and respectively encompass elements 25 and 19; and 5 and 7 respectively.

Figure 8:
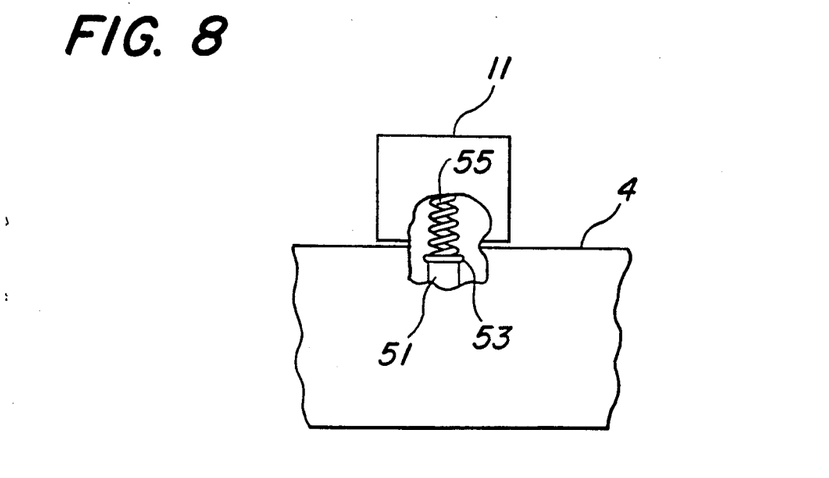
FIG. 8 illustrates a rotary device having a torsion spring that serves as another end-of-travel mechanism of the present invention.

A further embodiment having a rotatable shaft, previously mentioned with regard to FIG. 7, is shown in FIG. 8. FIG. 8 partially shows the frame 4 of FIG. 7 as well as the actuator 11 of FIG. 7. FIG. 8 illustrates, in a partially cut-away manner, the rotatable actuator 11 as having a shaft 51 with a lip portion 53 which has affixed thereto a torsion spring. Spring 55 serves in a manner similar as spring 35 of FIG. 4 as an end-of-travel mechanism. More particularly, if actuator 11 is rotated to its end position, spring 55 returns it to a position a predetermined distance from the end position, after, the force causing the rotation to its end position is removed.

Figure 9:
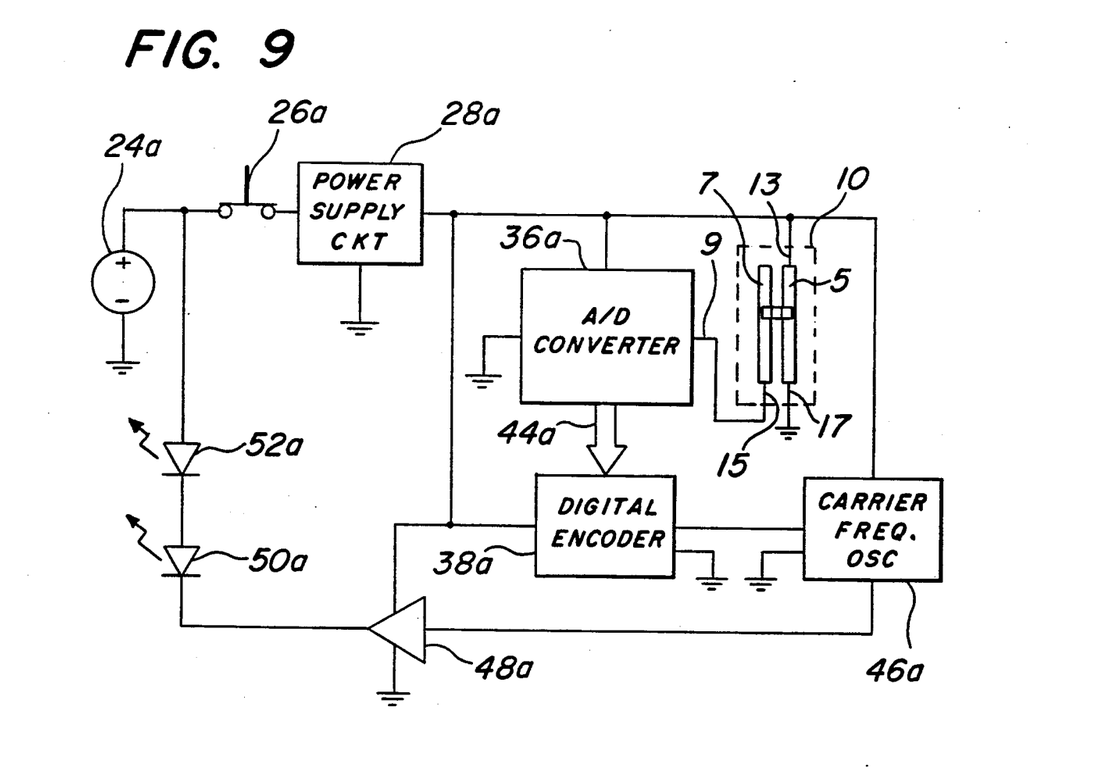
FIG. 9 illustrates a dimming circuit that cooperates with the variable impedance device and integral switch of the present invention.

A still further embodiment embracing the teachings of the present invention and related to the previously mentioned incorporated by reference U.S. patent application Ser. No. 079,847 (now Ser. No. 430,922, filed Nov. 1, 1989), is shown in FIG. 9. FIG. 9 shows a circuit arrangement that determines the amount of power supplied to a load such as a lamp. FIG. 9 shows circuit elements having reference numbers each of which is the same as that of Ser. No. 430,922 with the exception that a subscript "a" has been added to each and also that the of potentiometer 34 of Ser. No. 430,922 is replaced with the device 10 of the present invention. In general, the device 10 provides a signal which determines the operation of the A/D converter 36a and the digital encoder 38a. The circuit arrangement of FIG. 9, particularly suited for a wireless transmitter, operates in the same manner as described in Ser. No. 430,922 with the infrared diodes, now 50a and 52a, providing a signal output. Further, the movement of device 10 can be detected using the circuits of FIGS. 5 or 6 of the present application and detection of this motion can be used to operate switch 26a.

Since certain changes can be made to the variable impedance device and sensing circuit, described above, without departing from the scope of the invention herein described, it is intended that all matter contained in the above description or shown in the accompanying drawings shall be interpreted in an illustrative and not a limiting sense.

We claim:

1. A combination variable impedance device and switch comprising, in combination:
   (a) an extended resistive element,
   (b) an extended switching element, substantially co-extensive with said resistive element, and including alternating conductive and substantially non-conductive regions, said conductive regions being electrically connected,
   (c) at least one extended conductive element, substantially co-extensive with said resistive element, and
   (d) conductive sliding means to electrically connect said at least one conductive element to said resistive element and said switching element, respectively, at a selectable point along their extent whereby movement of said conductive sliding means causes the resistance between at least one end of said resistive element and said conductive element to vary and at the same time causes the conductive state between said switching element and said conductive element to alternate.

2. The combination of claim 1 wherein said resistive element has a linear taper.

3. The combination of claim 1 wherein said resistive element comprises two sections electrically separated by a small gap having dimensions sufficient to provide isolation between the two separated sections, each section connected to a corresponding terminal.

4. The combination of claim 1 wherein said elements are deposited onto a substantially non-conductive substrate.

5. The combination of claim 4 wherein said non-conductive substrate comprises a phenolic resin laminate.

6. The combination of claim 1 wherein said substantially non-conductive regions overlay a conductive element that forms said electrically-connected conductive regions.

7. The combination of claim 1 wherein said conductive regions overlay a non-conductive element that forms said substantially non-conductive regions.

8. The combination of claim 1 wherein said conductive sliding means is slidable along a linear path.

9. The combination of claim 1 wherein said conductive sliding means is slidable along a curved path.

10. The combination of claim 1 wherein the position of said conductive sliding means determines the power output of a dimming circuit.

11. A variable impedance device comprising, in combination:
    (a) an extended resistive element,
    (b) an extended conductive element,
    (c) conductive sliding means to electrically connect said conductive element to said resistive element at a selectable point along their extent, said sliding means being constrained to move along a path having two ends, and
    (d) resilient restoring means to engage said sliding means near at least one of said ends of said path and restore said sliding means to a point that is a predetermined distance from said at least one end after removal of a force which has moved said sliding means to said at least one end.

12. The device of claim 11 wherein said path is linear.

13. The device of claim 11 wherein said path is curved.

14. The device of claim 11 further comprising switching means.

15. The device of claim 11 wherein the position of said conductive sliding means determines the power output of a dimming circuit.

16. The device of claim 11 wherein the position of said conductive sliding means determines the signal output of a wireless transmitter.

17. The device of claim 11 wherein said restoring means comprises a coil spring.

18. The device of claim 11 wherein said restoring means comprises a cantilevered spring.

19. The device of claim 11 wherein said restoring means comprises a torsion spring.

* * * * *